United States Patent Office 2,989,817
Patented June 27, 1961

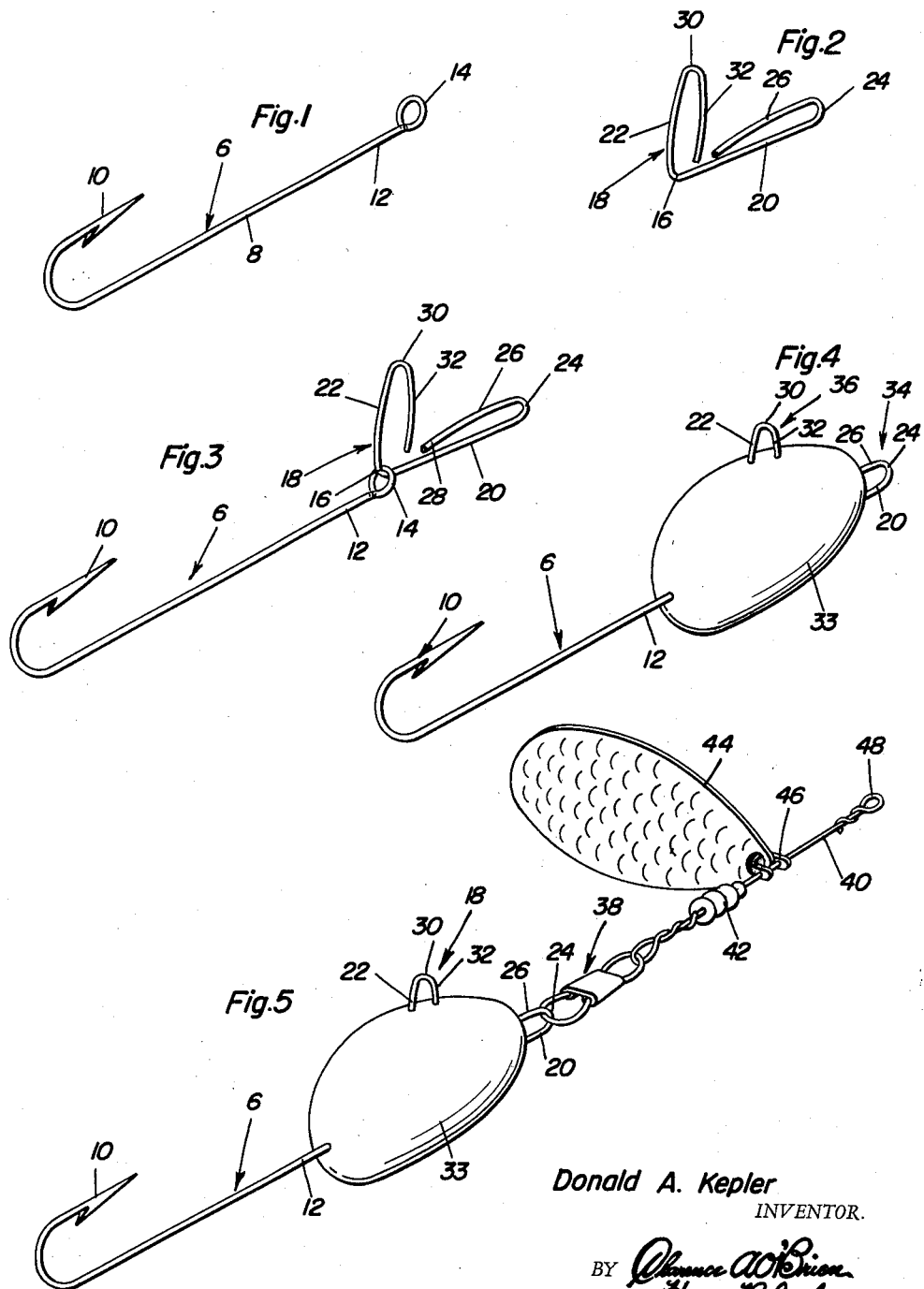

2,989,817
WEIGHTED HOOK WITH DUAL EYES
Donald A. Kepler, 1020 W. 4th St., Spencer, Iowa
Filed Nov. 5, 1958, Ser. No. 772,098
3 Claims. (Cl. 43—42.39)

The present invention relates to a hook-equipped fishing lure which may be used by itself as a jig or, alternatively used, by the addition of a spinner, for trolling or casting.

A jig, sometimes called a weighted fly, was primarily used in salt water for years on end but in recent years has been adopted for use in fresh water. Specifically a jig is characterized by a metal bullet-shaped head carrying a bucktail cooperating with the barbed end of a shank of a fishhook which is integrated with the head. In other instances the head is ovate or of some similar shape. However, the line attaching eye member is at the normal top or ventral side of the head for attachment thereto of a fishing line. The line is attached to the top eye member and jerked along and this constitutes jigging. A weighted ice fishing fly is similarly constructed and jerked up and down through a hole in the ice.

A spinner or spinner fly is a type of lure which has been continuously used for many years. The construction usually requires a tied fly, a spinner and usually a weight in front of or above the spinner, an elongated rod being provided with beads or the like on which the spinner is mounted.

The instant invention comprises a weighted head on the eye-equipped end of the conventional-type fishhook having means cooperable therewith providing two eye members, one eye member in substantial axial alignment with the hook's shank and the other eye member at right angles thereto and opening through the crest or top of the weighted head. The construction is such that it provides a weighted head that can be used for jigging or, if desired, a spinner may be added by connecting the same with the forward eye member for trolling or casting when a source of weight is desired as a component of the lure.

With the above and other objects in view the invention consists in the features of construction, combinations and arrangement of parts hereinafter set forth, illustrated in the accompanying drawings, and more particularly pointed out in the invention as claimed.

In the drawing:

FIG. 1 is a perspective view of a conventional type fishhook with a somewhat elongated shank terminating in a laterally bent eye member at the forward end of the shank.

FIG. 2 is a perspective view of the specially designed attachment which is used with the eye member in the manner seen in FIG. 3.

FIG. 3 is a perspective view showing the fishhook and the specially bent wire attachment joined together.

FIG. 4 is a perspective view which shows the finished lure construction, that is wherein the eye member, portion of the shank, and the double-eyed attachment are combined into a weighted entity.

FIG. 5 is a view also in perspective showing the lure of FIG. 4 with the forward or front eye member serving to accommodate a coupling or fastener on the rear end of a spinner assembly.

In the drawing in all figures, the fishhook is denoted by the numeral 6. This is a conventional-type except that the shank 8 is perhaps somewhat longer than an ordinary fishhook. In any event the barbed hook 10 is at the rear or left end. The forward end portion 12 has a laterally bent eye member 14. This eye member serves to accommodate the intermediate or median bend or bent portion 16 of the specially designed attachment 18. This attachment is formed from a length of wire bent upon itself between its ends providing a bend 16 and defining an L-shaped member having a long arm 20 and a right angularly disposed relatively short arm 22. The forward or free end portion of arm 20 is bent upon itself at 24 and provided with a return bend 26 the terminal 28 of which is adjacent the limb to provide an eye member. The free end of arm 22 is similarly bent at 30 and joins with a return bend or bent portion 32. The components 6 and 18, the fishhook and attachment, respectively, are assembled or joined together as seen in FIG. 3. It is within the purview of the invention to sell these components alone for use by a do-it-yourself fisherman. It is also within the purview of the invention to sell or provide and sell the complete or finished lure of FIG. 4. Therefore, in order to do so the hitched components 6 and 18 are joined together and then embedded in the ovate or egg-shaped lead or equivalent weight. That is to say, the several components are molded together into the entity depicted in FIG. 4 and in so doing the portions 20, 24 and 26 provide what may be called a front eye member 34 and simultaneously right angularly disposed top or crown eye member 36. The eye member 36 is equivalent to the usual eye member employed on a weighted jig. However, the jig in this instance also has the forward eye member 34 which provides for attachment on the line or a spinner assembly of the type seen in FIG. 5. Here the coupling or fastener 38 serves to accommodate the rod or shaft 40 having beads 42, a spinner 44, a clevis 46 mounting the spinner on the rod, and said rod terminating in an eye member 48 to which a fishing line (not shown) is attached.

It is repeated that the essence of the concept is the addition to a fishhook eye member of the special L-shaped attachment 18 and embedding the essential portions thereof in the ball-like lead weight 33.

Minor changes in shape, size, material and rearrangement of components may be resorted to in practice without departing from the spirit of the invention or the invention as claimed.

What is claimed as new is as follows:

1. A fishing device comprising a solid weight of prescribed shape and mass, a single fishhook having a shank a portion of which is embedded axially in the weight, a first line attaching eye member projecting above the peripheral surface of a median dorsal portion of the weight, and a second eye member embedded in and projecting beyond the forward end portion of the weight in general axial alignment with the axis of the shank, said eye member being selectively as well as collectively usable, said eye members comprising bent end portions provided on right angularly disposed arms constituting components of an L-shaped wire member, said wire member being embedded in said weight and an end portion of said shank being connected to said wire member.

2. In combination, a fishhook embodying a shank, a barbed hook at one end of the shank, and an eye member at the other end of the shank, a separate L-shaped member having long and short arms the adjacent ends of which are joined by an angular bend, the other ends of the respective arms being free and bent upon themselves and providing return bends, the eye member on said shank being joined to said L-shaped member at the juncture of said long and short arms, a solid weighted body, said angular bend and major portions of said return bends being embedded in said body, and said return bends projecting beyond surface portions of the body to provide the body with selectively and collectively usable eye members.

3. A fishing device comprising a substantially solid weight of prescribed shape and mass, a single fishhook having a shank comprising a portion which is embedded axially in the weight, a first line attaching eye member exposed in the vicinity of the peripheral surface of a median dorsal portion of the weight, and a second eye member exposed in the vicinity of the forward end portion of the weight in general axial alignment with the axis of the shank, said eye members being selectively as well as collectively usable, said eye members comprising bent end portions provided on right angularly disposed arms constituting components of an L-shaped wire member, said wire member being embedded in said weight and an end portion of said shank being connected to said wire member.

References Cited in the file of this patent

UNITED STATES PATENTS

| | | |
|---|---|---|
| 167,687 | Pitcher | Sept. 14, 1875 |
| 1,598,786 | Romadke | Sept. 7, 1926 |
| 1,813,722 | Wright et al. | July 7, 1931 |
| 2,006,604 | Post | July 2, 1935 |
| 2,115,302 | Chochard | Apr. 26, 1938 |
| 2,795,886 | Johnson | June 18, 1957 |